United States Patent
Meriac (10) Patent No.: US 11,108,779 B2
(45) Date of Patent: Aug. 31, 2021

(54) TIME-LIMITED ACCESS TO CONFIGURATION SETTINGS

(71) Applicant: ARM IP Limited, Cambridge (GB)

(72) Inventor: Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 303 days.

(21) Appl. No.: 15/433,297

(22) Filed: Feb. 15, 2017

(65) Prior Publication Data
US 2017/0257372 A1  Sep. 7, 2017

(30) Foreign Application Priority Data

Mar. 3, 2016  (GB) .................................... 1603722

(51) Int. Cl.
| | |
|---|---|
| *H04L 29/06* | (2006.01) |
| *G06F 9/4401* | (2018.01) |
| *H04W 84/18* | (2009.01) |
| *H04W 12/082* | (2021.01) |
| *H04L 29/08* | (2006.01) |
| *H04W 12/61* | (2021.01) |

(52) U.S. Cl.
CPC .......... *H04L 63/101* (2013.01); *G06F 9/4411* (2013.01); *G06F 9/4418* (2013.01); *H04L 63/0823* (2013.01); *H04L 63/108* (2013.01); *H04L 67/12* (2013.01); *H04L 67/34* (2013.01); *H04W 12/082* (2021.01); *H04W 84/18* (2013.01); *H04W 12/61* (2021.01)

(58) Field of Classification Search
CPC . H04L 63/101; H04L 63/0823; H04L 63/108; H04L 67/12; H04L 67/34; H04W 12/082; H04W 84/18; H04W 12/61; G06F 9/4411; G06F 9/4418; G06F 21/604; G06F 21/6218; G05B 15/02; G05B 19/418; G05B 2219/2642
See application file for complete search history.

(56) References Cited

U.S. PATENT DOCUMENTS

| | | | | |
|---|---|---|---|---|
| 7,299,493 | B1 * | 11/2007 | Burch | .................... G06Q 40/04 380/1 |
| 2008/0148372 | A1 * | 6/2008 | Goffin | ..................... H04L 12/66 726/6 |

(Continued)

FOREIGN PATENT DOCUMENTS

| | | |
|---|---|---|
| CN | 101166163 | 4/2008 |
| EP | 1 560 394 | 8/2005 |

OTHER PUBLICATIONS

Combined Search and Examination Report for GB 1603722.8, dated Jul. 25, 2016, 6 pages.

(Continued)

*Primary Examiner* — Henry Tsang
(74) *Attorney, Agent, or Firm* — Nixon & Vanderhye P.C.

(57) ABSTRACT

Broadly speaking, embodiments of the present techniques provide methods and apparatus to implement a time-limited configuration settings hierarchy. The time-limited configuration settings hierarchy introduces a temporary override setting that allows a fail-back to a prior setting after the expiry of a time period. This allows temporary users of IoT devices to have much higher levels of privilege over configuration settings, as an automatic revocation of the permission and reversion to the previous settings is guaranteed on the expiry of the specified time period.

10 Claims, 4 Drawing Sheets

Method 100'

(56) References Cited

U.S. PATENT DOCUMENTS

| | | | |
|---|---|---|---|
| 2012/0011561 A1* | 1/2012 | Courtney | G06F 21/604 |
| | | | 726/1 |
| 2012/0166783 A1* | 6/2012 | Kamdar | G06F 11/1417 |
| | | | 713/2 |
| 2012/0240060 A1* | 9/2012 | Pennington | G06F 1/1618 |
| | | | 715/753 |
| 2013/0052990 A1* | 2/2013 | Zhang | H04L 63/20 |
| | | | 455/411 |
| 2013/0326215 A1* | 12/2013 | Leggette | H04L 63/0823 |
| | | | 713/156 |
| 2014/0281490 A1* | 9/2014 | Prakash | H04L 63/062 |
| | | | 713/155 |
| 2014/0310771 A1 | 10/2014 | Marshall et al. | |
| 2014/0344951 A1 | 11/2014 | Brewer | |
| 2015/0149023 A1 | 5/2015 | Attard et al. | |
| 2015/0186677 A1* | 7/2015 | Sankar | G06F 21/71 |
| | | | 726/34 |
| 2016/0234186 A1* | 8/2016 | Leblond | H04L 45/14 |

OTHER PUBLICATIONS

First Office Action for CN Application No. 201710118736.2 dated Feb. 1, 2021 and English translation, 22 pages.

* cited by examiner

TIME-LIMITED ACCESS TO CONFIGURATION SETTINGS

This application claims priority to GB Patent Application No. 1603722.8 filed 3 Mar. 2016, the entire contents of which is hereby incorporated by reference.

FIELD OF THE INVENTION

The present invention relates to the provision of secure, time-limited access to configuration settings for devices, and in particular for subordinate devices in a network of devices.

BACKGROUND

Since the advent of the Internet, there has been a rapid increase in the interconnectedness of devices capable of storing and processing data. Now, with the development of what is known as the Internet of things (IoT), devices that were not conventionally equipped to store and process data are becoming so equipped. Examples are the so-called "intelligent home", in which lighting, heating, cooling and alarm systems can be remotely monitored and controlled over networks of wired and wireless systems. The intelligent home concept is also being extended into workplaces and places used for temporary accommodation, such as hotels. Vehicles are now also increasingly sophisticated in their on-board electronics, including many features such as remote GPS tracking, navigation systems and the means to store and recall driver preferences in such matters as seat positioning, entertainment and many other features.

These sophisticated and interconnected systems may share the disadvantageous characteristic that they assume that the owner or a manager or manager's delegate will be the permanent holder of permission to access and modify settings. In the example of a vehicle, the key device may store driver and passenger preference settings to be applied when the key is present, but those settings are, or are at least conceived to be, permanent up to the point of change of ownership, when all settings are likely to be cleared and reset by the new owner. No account is taken of any more granular level of control.

In situations in which control over certain equipment is to be given to, for example, a hotel guest, a car rental client, an employee (workplace or domestic), or a neighbour or friend of a temporarily absent property-owner, it may be desirable to apply restrictions to the permissions granted at a greater level of granularity.

SUMMARY

The present invention broadly provides technologies to control such restrictions and permissions.

In a first approach, the disclosed technology provides a machine-implemented method of controlling prioritized temporary access to a configuration setting of a subordinate device in a network of electronic devices, comprising establishing a configuration data access control list having a prior setting; granting permission to a configuration control interface device to override the prior setting for a time period by adding a time-limited override parameter to the access control list; responsive to the granting permission, permitting the configuration control interface device to override the prior setting and modify the configuration setting of at least one the subordinate device during the time period; and responsive to expiry of the time period, removing the time-limited override parameter from the access control list and reverting to the prior setting.

In a second approach, there may be provided an electronic system operable to control prioritized temporary access to a configuration setting of a subordinate device in a network of electronic devices, comprising a first electronic component operable to establish a configuration data access control list having a prior setting; the first electronic component further operable to grant permission to a configuration control interface device to override the prior setting for a time period by adding a time-limited override parameter to the access control list; a second electronic component responsive to the granted permission to permit the configuration control interface device to override the prior setting and modify the configuration setting of at least one the subordinate device during the time period; and the first electronic component further responsive to expiry of the time period to remove the time-limited override parameter from the access control list and to revert to the prior setting.

BRIEF DESCRIPTION OF THE DRAWINGS

Implementations of the disclosed technology will now be described, by way of example only, with reference to the accompanying drawings, in which.

DETAILED DESCRIPTION

Broadly speaking, embodiments of the present techniques provide a time-limited configuration settings hierarchy, introducing a temporary override setting that allows a fallback to a prior setting after the expiry of a time period. This allows temporary users of IoT devices to have much higher levels of privilege over configuration settings, as an automatic revocation of the permission and reversion to the previous settings is guaranteed on the expiry of the specified time period.

Figure 1:
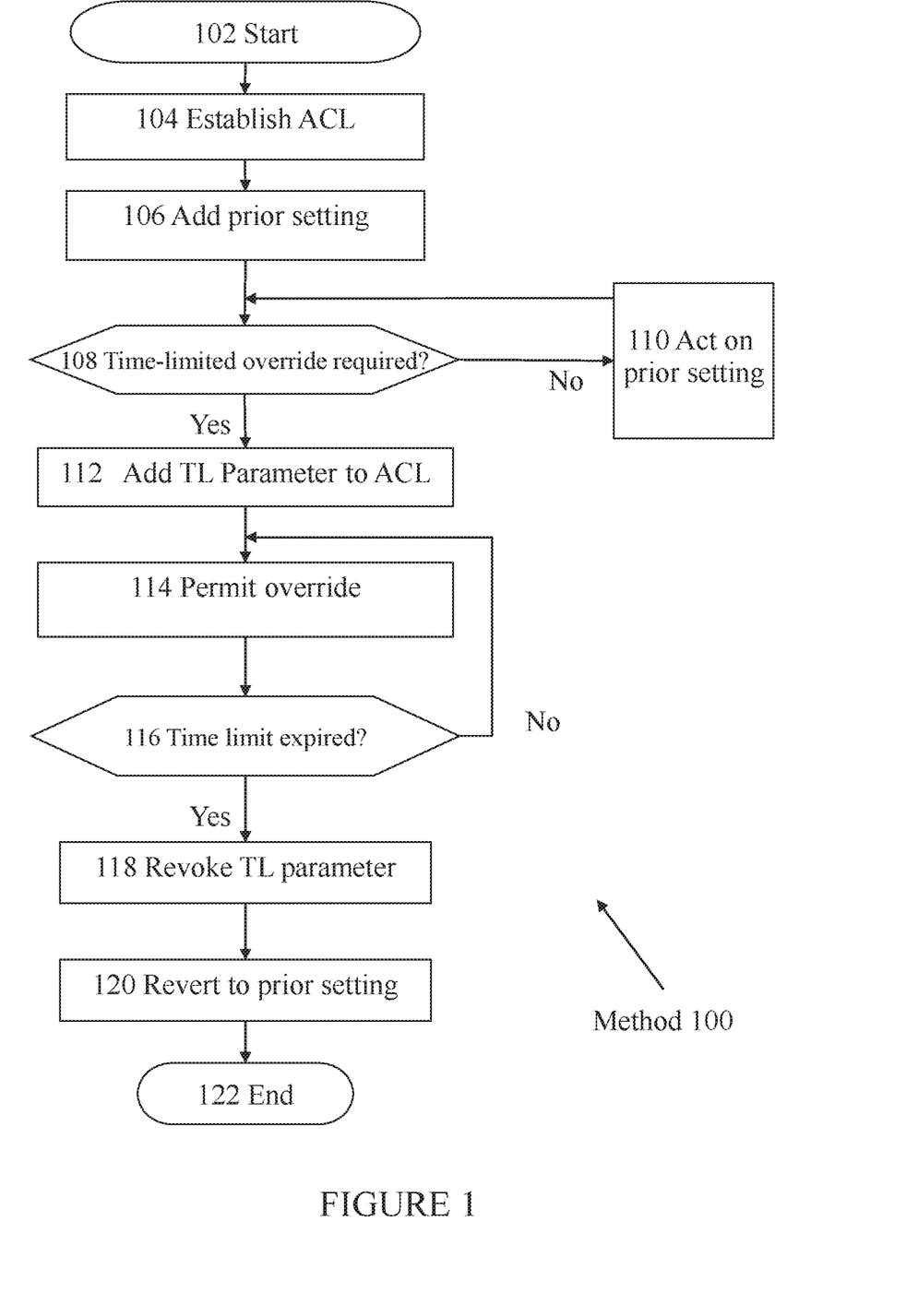
FIG. 1 shows a method of controlling temporary access to a configuration setting of a device.

FIG. 1 shows an example method 100 of controlling temporary access to a configuration setting of a subordinate device in a network of electronic devices. The subordinate device may be an everyday object, such as a light, a motor for window blinds, a heating system, and so on. Everyday objects and relatively small scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients while they are at home. In the cases described above the data is generally forwarded to a cloud service on the internet.

However, such devices tend to have low processing power and small memory capacity. The devices may lack user interfaces because, for example, of the cost of having a user interface such as a display, or because a display consumes too much power, or because of the physical size of the device itself making it difficult to provide a user interface. The devices may need to be configured in order to connect to the IoT or to other devices/services, but may lack, or have reduced capabilities for, configuration directly on the device. The low processing power/small memory capacity of such devices may make them more vulnerable to attack (e.g. being hacked).

Such extended capabilities for devices bring advantages, but at the same time the devices may be disadvantageously vulnerable to potentially harmful activity, which may comprise threats to the system or to the wider network, whether caused inadvertently by incorrect programs or, worse, by deliberate insertion of malicious code or of false data that may vitiate the effects of otherwise non-malicious execution code. The interconnectedness of modern devices means that untrustworthy code or data may become widely disseminated over the network, so that it is present in many devices, each of which may in turn act as a new source of onward infection.

A particular problem that may arise is that of untrustworthy configuration data, which may be entered directly into device storage by a human operator, or may be received over a communications channel and programmatically placed in device storage. In some cases, such untrustworthy code or data may become resident in such a way that restarting or resetting the device may not detect or remove it, so that the ill effects continue when the untrustworthy code or data is brought back to life after a restart from where it lay hidden in the configuration data.

For a better understanding of the background to the present technology, it is necessary to make clear that where devices are interconnected into a very wide and heterogeneous network, it would be optimistic to expect that security and integrity, or trustworthiness, can be absolutely guaranteed. Those of skill in the art, therefore, occupy themselves with all possible means of reducing the vulnerability of their systems by constraining, wherever possible, the "attack surface" of the system or device—that is, by reducing the opportunities for malicious or merely inadvertently untrustworthy code and data to enter the system or device, and then, if such code or data is detected, reducing as much as possible its opportunity to cause harm and to spread to other systems.

Turning back to FIG. 1, the method 100 begins at start step 102, and at step 104 a configuration data access control list (ACL) is established for a subordinate device, or for a plurality of subordinate devices of the same type. The access control list (ACL) is a list of permissions attached to an object (e.g. a subordinate device), where the list identifies an entity (e.g. a user, a set of users, system processes etc.) and specifies the access rights allowed and/or denied to that entity. The ACL may also specify what operations each entity may be able to perform with respect to the object. The ACL may specify multiple entities and the access rights for each entity, or a separate ACL may be established for each entity. In either case, each entity may have an associated permission level or priority level. For example, an owner of a subordinate device may have a higher permission level than a user/temporary user of the subordinate device. That is, a higher permission level may grant more access rights to an entity, and/or may grant the right to override operations performed by an entity with a lower permission level.

For example, a subordinate device may be a lighting device in a house, in which case a configuration data ACL may be established for that particular lighting device. The ACL may be established for each individual occupant of the house (or for a pre-defined group of occupants), where each individual or group is considered a separate entity. An ACL may be established for a subordinate device in a house which specifies each occupant as a different entity, and/or specifies a group of occupants as an entity. For example, if a house is occupied by a family, the parent(s) may be considered one entity and may be granted access, via an ACL, to control the thermostat (a subordinate device), but the children may be considered as a second entity and may not be granted access, via the ACL, to control the thermostat. This may require each entity (individual or group) to be identifiable, e.g. by the use of usernames or other identifiers. In another example, the house may be a rented house, and the owner of the house and the current tenants may be treated as separate entities in the ACL for each subordinate device. The ACL may specify that the owner and tenants have differing permissions for each subordinate device in the house, where the permissions may be associated with a time limit or expiry date (e.g. the end of the tenancy period). In each case, the parent(s) and owner(s) may establish the ACL for themselves as well as for other entities (e.g. children, guests, tenants). In another example, a subordinate device may be a lighting device of a particular type (e.g. a bedside lamp, a bathroom light, a light of a specific model/serial number etc.) located in each room in a hotel. In this case, a configuration data ACL may be established for all lighting devices of that type within the hotel, so that the same configuration settings may be applied to the lighting devices simultaneously and more efficiently.

At step 106, a prior setting is added to the established configuration data ACL for the subordinate device(s). The prior setting is a configuration setting, or a plurality of configuration settings, which are the default settings of the subordinate device at particular times. For example, the prior setting may be a setting that applies every other week on Tuesday to Wednesday, or may be a setting which applies every day between 06:00 and 09:00. In an example scenario where the subordinate device is a lighting device located in each room in a hotel, the prior setting may be to turn on the light between 18:00 and 22:00 each day, and may be to turn off the light between 22:01 and 09:00 each day. Once the prior setting has been added to the configuration data ACL for the subordinate device, the prior setting is automatically used to control the subordinate device, unless the prior settings are overridden. The prior setting specified in the ACL may be different for each entity (e.g. each user) of the subordinate device, or the prior setting may be the same for each entity.

The configuration data ACL and the prior setting may be set using a user interface on a configuration control interface device. The configuration control interface device may be used to configure a single subordinate device or multiple subordinate devices of the same type (e.g. all lighting devices, or lighting devices located in the same position in guest rooms in a hotel—such as a bathroom light or a bedside lamp —, or all lighting devices of the same model, etc.), or multiple subordinate devices of different types (e.g. a lighting device and a heating device). The configuration control interface device may be used by guests or visitors to temporarily change the settings of the subordinate device. Additionally or alternatively, a user interface on or coupled to a subordinate device may be used by guests or visitors to temporarily change the settings of the subordinate device.

The configuration control interface device is described in more detail below with reference to FIG. 3.

Turning back to the example method 100 shown in FIG. 1, at step 108 a check is performed to determine if a time-limited override is required. For example, in the example scenario of the hotel room, a guest may check-in to a particular room for 48 hours and during this time, the guest may be permitted to override some or all of the prior settings of a subordinate device in his hotel room. The check of step 108 may be performed periodically to determine if a time-limited override is required. The time-limited override may be a time-limited parameter or setting for the subordinate device which is only applicable for a particular predefined period of time. For example, a hotel guest may enter a time-limited parameter related to the operation of a lighting device in his hotel room, which is only applicable for the duration the guest stays in the hotel. Thus, the time-limited parameter may comprise two components: a setting or parameter related to the operation of a subordinate device, and a time period which defines how long this setting or parameter can be applied to the subordinate device. Alternatively, the time-limited parameter may only comprise the setting or parameter related to the operation of a subordinate device, and the time period may be provided separately. In either case, the time period may be specified by the owner of the subordinate device (e.g. the owner of the hotel). For example, if a guest checks-in to a hotel or if a person rents a car for a specific amount of time, the time and date by which the guest must check-out or the person must return their rental car will be known from the hotel booking and car rental booking respectively. Accordingly, for example, this time period information may be provided to the ACL for the subordinate device(s) associated with the guest's hotel room or rental car.

If no time-limited override is required, operation of the subordinate device is controlled via the default prior settings (step 110) and the method returns to checking whether the time-limited override is required or has been entered by a user of the subordinate device.

Step 108 may be performed whenever a user inputs a change to the prior setting(s) for a subordinate device. The user may input the change via a configuration control interface device, as described in more detail below. Alternatively, step 108 may be performed at regular intervals and/or at appropriately spaced intervals. For example, it may be sufficient to perform the check of step 108 once or twice a day, for a subordinate device located in a hotel room, because guests typically check-in to a hotel room for a day or more. If the subordinate device is, or is coupled to, a rented device such as a vehicle or a bicycle, it may be appropriate to perform the check of step 108 more frequently, because vehicles and bicycles may be rented by the hour.

If at step 108 it is determined that a time-limited override is required, a time-limited parameter is obtained and added to the configuration data ACL at step 112. As mentioned above, the time-limited parameter may comprise two components: a setting or parameter related to the operation of a subordinate device, and a time period which defines how long this setting or parameter can be applied to the subordinate device. Alternatively, the time-limited parameter may only comprise the setting or parameter related to the operation of a subordinate device, and the time period may be provided separately. In any case, the time period for which the time-limited override is required is provided or obtained. Step 112 may comprise granting permission to a configuration control interface device to override the prior setting for a time period by adding a time-limited override parameter to the access control list for the subordinate device. For example, if a guest has checked-in to a hotel room for two nights, the time-limited parameter may be 48 hours starting from the time the guest checked-in, or may be the number of hours between his check-in time and the hotel's latest check-out time on his departure date. Once the time-limited parameter has been added to the ACL, the prior settings of the subordinate device may be overridden during the specified time period (time limit). Thus, if an attempt is made to alter the prior settings during this time period, the override may be permitted (step 114). Thus, responsive to granting permission, the method may comprise permitting the configuration control interface device to override the prior setting and modify the configuration setting of at least one subordinate device during the time period.

Periodically or otherwise, at step 116 a check is performed to determine if the time limit has expired. If the time limit has not yet expired, it remains possible for prior settings to be altered. If the time limit has expired, the time-limited parameter added to the configuration data ACL is revoked at step 118 to prevent the prior settings from being overridden. Thus, responsive to expiry of the time period, the method may comprise removing the time-limited override parameter from the access control list and reverting to the prior setting. At step 120, the settings of the subordinate device revert back to the prior settings and the process ends at step 122.

Figure 2:
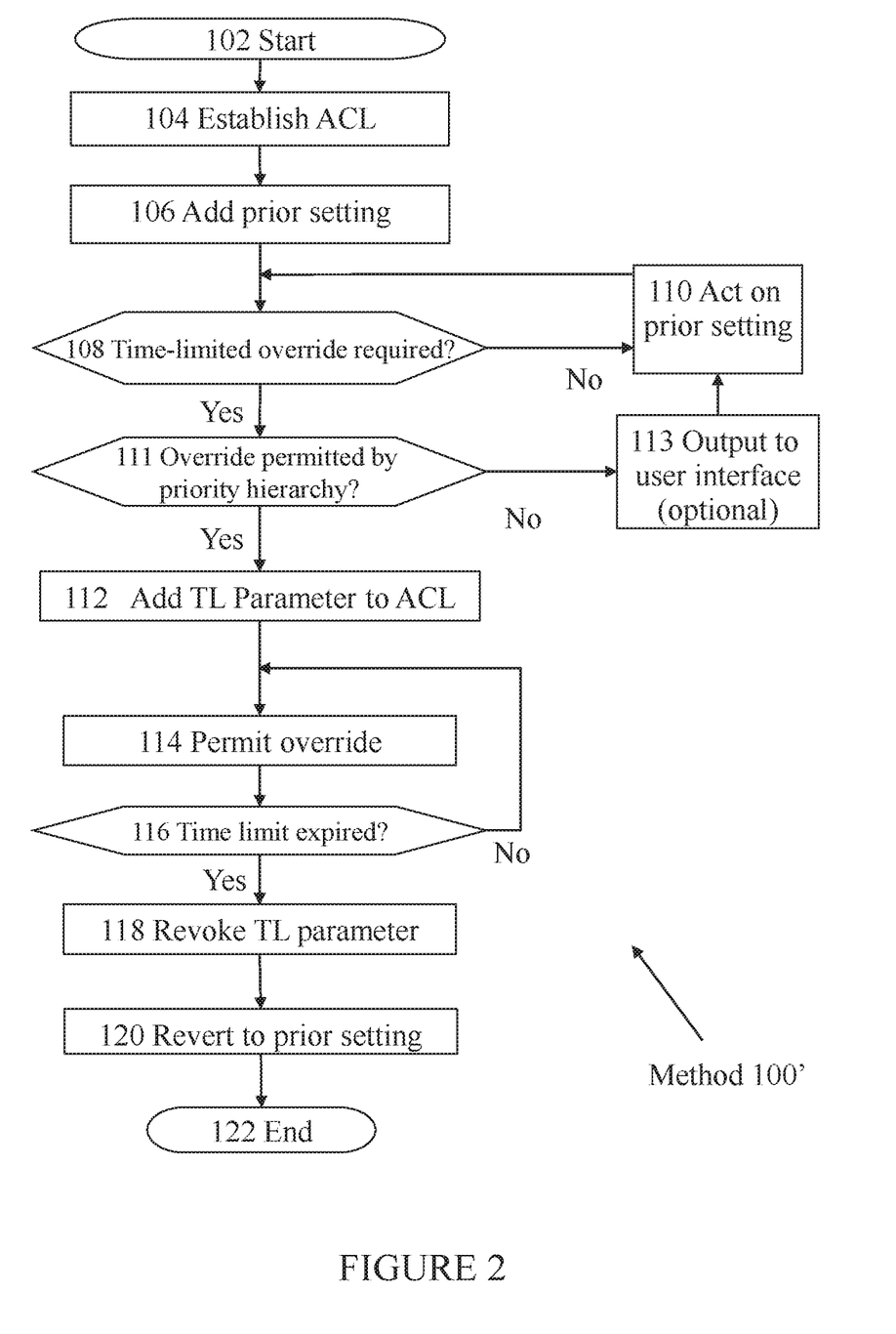
FIG. 2 shows a method of controlling temporary access to a configuration setting of a device using a hierarchy of priorities.

FIG. 2 shows a method 100' of controlling temporary access to a configuration setting of a device using a hierarchy of priorities. Certain steps in method 100 shown in FIG. 1 and described above are similar to those of method 100'. Consequently, the following description focuses on the differences between methods 100 and 100'.

In method 100', at step 108 a check is performed to determine if at least one time-limited override is required for the subordinate device, as described earlier. For example, a guest who has checked-in to a hotel room may alter the time at which his room lights automatically turn-off at night, or he may alter both times at which his room lights automatically turn-off at night and turn-on in the afternoon. If no time-limited override is required, operation of the subordinate device is controlled via the default prior settings (step 110) and the method returns to checking whether the time-limited override is required or has been entered by a user of the subordinate device.

If a time-limited override is required, a further check is performed at step 111 to determine if the at least one override setting is permitted by a priority settings hierarchy. The priority settings hierarchy may be used to determine whether the override settings are allowed or if the prior settings should be used instead. For example, a hotel may have added a prior setting for music playing devices (or televisions, or other sound-emitting devices) located in each room, the prior setting specifying that the maximum volume at which sound is emitted from the music playing device cannot be used beyond 20:00 to prevent other guests in the hotel being disturbed. The hotel may have defined this prior setting to be a high priority setting, which should not be overridden by anyone. A guest in a particular room in the hotel may attempt to change the setting so that he can play music at the maximum volume until 22:00 at night. However, the high priority of the prior setting means that the guest cannot override the prior setting. That is, the guest's attempt to override the prior setting is itself overridden by the hotel's original, high priority prior setting. Thus, in embodiments, during the time period associated with the override setting, a reserved power of higher priority in a hierarchy of priorities may permit a further override of the time-limited override parameter. Additionally or alternatively, step 111 may be performed after the time-limited parameter is added to the ACL (i.e. may be performed after step 112). In this case, during the time period added to the configuration data ACL, a reserved power of higher priority in a hierarchy of priorities may permit a further override of the time-limited override parameter.

The term "reserved power of higher priority" is used herein to mean a "reserved higher level of priority" or a "reserved higher level of control". That is, in embodiments, a user may be able to change particular settings of a subordinate device but these changed settings may be overridden by someone who has a superior or higher level of control of the subordinate device. For example, another user of the subordinate device, or the owner of the subordinate device may always have a higher level of priority, or may only have a higher level of priority in particular circumstances. In an illustrative example, a parent and his child may be guests in a hotel, and the subordinate device may be a music-playing device in their hotel rooms. In this example, the child may be able to override the volume settings of the music-playing device in his room, but the parent may be provided with a reserved higher level of control of the subordinate device, to prevent the child from playing music too loudly. Alternatively, the hotel owner may be the only person with a reserved higher level of control and can override both the parent and child's attempts to override the volume settings of the music-playing device. Thus, the reserved power of higher priority specifies a user (or potentially another device) which is able to override attempts to override a subordinate device setting, under certain circumstances.

Accordingly, if at step 111 it is determined that the received override setting is not permitted by the hierarchy of settings, the subordinate device is operated based on the prior settings (step 110). Optionally, the user attempting to override the prior settings of the subordinate device may be presented with a message (aural and/or visual) via a user interface to inform him that his override setting has been overridden by the owner of the device (step 113).

If at step 114' it is determined that the received override setting is permitted by the hierarchy of settings, the process continues from step 112 as previously described with reference to FIG. 1.

Thus, an owner of a subordinate device may be able to add a high priority flag or similar priority indicator to the prior setting added at step 106 in method 100'. This priority indicator may be used to determine if an override is permitted. The high priority flag may be associated with a particular setting of a subordinate device, or more than one setting of a subordinate device. For example, a hotel owner may add a high priority flag to the start and end times at which the maximum volume of a music playing device can be used. In another example, a hotel owner may add a high priority flag to the time at which motorised window blinds are lowered at night (for security reasons), but may not add a high priority flag to the time at which the motorised window blinds are raised in the morning.

In embodiments, during the time period for which a time-limited override parameter is applicable, a further parameter in the access control list of the subordinate device may determine the volatility of at least one of the time-limited override parameter and the further override parameter following an interruption and resumption of an in-use state of a device in the network of devices. Typically, a subordinate device or a device which stores the configuration data access control list comprises a memory. The memory may be volatile memory (i.e. memory which requires power to maintain the stored information) or non-volatile memory, or a combination of both. In embodiments, the prior setting(s) of a subordinate device may be stored in non-volatile memory, (e.g. in flash memory), while the time-limited override parameter may be stored in volatile memory (e.g. SRAM). Thus, if power is disconnected from the memory of the device which stores the settings of the subordinate device, the settings of the subordinate device may, by default, revert to the prior settings stored in the non-volatile memory. Access to the non-volatile memory may be prevented, such that a user cannot override the prior settings stored in the non-volatile memory. A prior setting may be temporarily overridden by storing the time-limited override parameter in the volatile memory, from where it can be retrieved and implemented by the permission grant and revoke component 211, but the prior setting itself is not altered within the non-volatile memory.

For example, if the subordinate device enters a sleep mode (to e.g. conserve power when it is not in use), and then enters a wake mode in which it becomes operational/functional, the further parameter may determine whether the time-limited override parameter and the further override parameter can be understood by the subordinate device when in the wake mode, or may determine whether the override parameters conflict with each other. This may reduce the risk that operation of the subordinate device is adversely affected by an interruption and resumption of its in-use state. It may reduce the risk of settings being altered in a way that is incompatible with the prior setting and the hierarchy of settings. For example, if a user manually turns a subordinate device off and on (i.e. reboots) in order to try and reset the configuration settings of the device, the further parameter may be used to determine if any entered override parameter and further override parameter is compatible with the prior setting and the hierarchy of settings for improved security. The interruption and resumption may comprise at least one of a sleep-wake cycle, a power cycle and a failure and resume cycle.

In embodiments, establishing a configuration data access control list comprises establishing a cryptographically verifiable access control list (ACL) to permit tamper-prevention. For example, there may be provided a secure storage mechanism to store the access control list for each subordinate device, which requires an indicator of trustworthiness before it will allow the ACL to be modified (temporarily or otherwise). For example, the ACL may be accompanied by an authentication certificate (using any of the known techniques for providing such certificates, such as the "trusted third party" system) indicating that the configuration data can be trusted. Sources of trust can be, for example, provisioning servers, user's devices, input provided by means of a user interface supplied physically on the device, etc. In an alternative, when a device is purchased it may have a set of trusted certificates for updates, and there may also be provided a mechanism for adding other sources of secure configuration data. The configuration data ACL may be stored along with either the certificate or a reduced form of the certificate, such as a partial hash, to form a fingerprint. By thus storing the fingerprint that was used to allow the storage of configuration data ACL, it is possible to know whether the ACL should continue to be trusted when other systems in the network that were configured using the same data are discovered to have been compromised. If configuration data ACL is no longer trusted, its effects can be invalidated. Examples of how the configuration data ACL could be secured to prevent tampering are described in the Applicant's co-pending United Kingdom patent application number GB1513586.6.

In embodiments, granting permission comprises granting access to a subset of subordinate devices. For example, a hotel may contain multiple different subordinate devices, such as lighting devices, televisions, heating devices and so on. In this example, the step to grant permission may comprise granting permission to override the prior settings for a time period for a subset of the subordinate devices in the hotel, such as just the lighting devices in a guest's hotel room, or all of the subordinate devices in a guest's hotel room (but not elsewhere in the hotel). This may improve the efficiency of permitting prior settings to be overridden, as the permission may be granted for multiple subordinate devices at the same time.

In embodiments, the step to grant permission may comprise granting access to a subset of the hierarchy of priorities.

In embodiments, the step to grant permission may further comprise granting permission to delegate the permitting to a further configuration control interface device to override the prior setting. This is described in more detail below with reference to FIG. 3.

In each of the embodiments described with respect to FIGS. 1 and 2, the time-limited override parameter is described as being revoked in response to the expiry of the time period associated with the override parameter. In embodiments, the time period may be formed of the combination of 'usage time' and 'goodwill time'. For example, if a user is staying in a hotel for 48 hours, the 'usage time' may be 48 hours, and the 'goodwill time' may be 15 minutes to allow the user enough time to pack all his belongings, leave the room and complete the checkout process. Similarly, if a user is renting a bicycle or vehicle for 24 hours, the 'usage time' may be 24 hours, and the 'goodwill time' may be 30 minutes to account for road traffic or time needed to travel to the nearest petrol station to refuel the vehicle. In some cases, the 'goodwill time' may change over time. For example, if a vehicle is due to be returned at night when there is little congestion/traffic, the 'goodwill time' may be less than if the vehicle is due to be returned during rush hour. In embodiments, the 'goodwill time' may be zero, such that the time period is formed only of the usage time. This may be the case if the usage time needs to be adhered to strictly.

In embodiments, the time-limited override parameter may be revoked when the sum of the usage time and the goodwill time expires, by removing the time-limited override parameter and reverting to the prior setting as described above. Additionally or alternatively, the time-limited override may be revoked by revoking a digital signature which was used to validate the authenticity of the request to override a setting of the subordinate device. For example, when a user requests to make a change to a setting of a subordinate device, the validity of the request may be checked and if the request has originated from a known user with appropriate permissions, a digital signature may be applied or associated to the changed setting. This may prevent requests originating from unknown entities being applied, as the system may be configured to only apply changes to settings if they are associated with a digital signature. In this embodiment, the time-limited override parameter may be revoked by revoking or deleting the associated digital signature.

Additionally or alternatively, the time-limited override may be revoked by revoking an intermediate certificate. The intermediate certificate may be associated with a user of the subordinate device, or may be associated with an instance (e.g. a particular use of a subordinate device, or a particular time-limited override parameter of a subordinate device). The intermediate certificate may be created for a user by the owner of the subordinate device, and the intermediate certificate may include details on, for example, what permissions the user has with respect to the subordinate device and how long the intermediate certificate is valid for (e.g. the usage time plus the goodwill time). The intermediate certificate may be used by the user when he requests a time-limited override of a setting of the subordinate device. Accordingly, the time-limited override setting/parameter may be revoked simply by revoking the intermediate certificate, as this contains the permissions which allowed the user to make changes to the settings of the subordinate device.

In an illustrative example, a guest may check into a hotel and may already have, or may be given, a guest identity "GID". The hotel owner may create an intermediate certificate for the guest, "GCert(GID)", which is valid for a particular length of time (e.g. the combination of a usage time and a goodwill time). The intermediate certificate may specify permissions for the guest, such that the guest is limited to making changes to subordinate devices in his room only, or to subordinate devices in his room and in communal areas (e.g. to equipment in a hotel gym). The guest may use his guest identity, GID, to make various requests to change settings of one or more subordinate devices, and uses (e.g. quotes) his intermediate certificate, GCert(GID), as permission to do so. When the guest checks out of the hotel, the hotel owner revokes the intermediate certificate for that guest and the settings of all the subordinate devices which the guest has changed will automatically and immediately revert to the prior settings. In embodiments, the intermediate certificate is automatically revoked upon expiry of the time period (i.e. the sum of the usage time and goodwill time), whether or not the guest has checked out of the hotel. This intermediate certificate technique may be implemented using an X509 based ACL set up, as mentioned below. Using an intermediate certificate in this way may provide an efficient way to revert subordinate device settings to the prior settings at the end of the time period, since the settings of multiple subordinate devices may all be reverted to the prior settings substantially simultaneously, and without anyone needing to know which settings on which devices were actually changed.

In each of the embodiments described above with reference to FIGS. 1 and 2, at step 104 a configuration data access control list (ACL) is established for a subordinate device, or for a plurality of subordinate devices of the same type. In embodiments, an ACL may already exist for the subordinate device.

Accordingly, in embodiments, at step 104, if an ACL already exists for a subordinate device, the newly-established ACL may automatically replace the existing ACL. In embodiments, a user who establishes the new ACL may be prompted to confirm that the newly-established ACL should replace the existing ACL. That is, an ACL having a later creation date may replace an ACL having an earlier creation date, for a subordinate device.

As mentioned above, each ACL may specify different entities (which may have the same or different permissions). In some embodiments, each entity may have different priority levels/permission levels. For example, the owner of a subordinate device may have a higher permission level/priority level than a temporary user of the subordinate device. Thus, if at step 104 a new ACL is established for a subordinate device, it may not automatically replace an existing ACL if the existing priority levels are violated. This may prevent, for example, an entity having a low priority level from changing the ACL in a way that grants the entity a high priority level, or from deleting an entity having a high priority level from the ACL, etc. Thus, in embodiments, the newly-established ACL may be compared with the existing ACL to determine what changes have been made, and a check may be performed to determine if the newly-established ACL originates from an entity which has the required permissions to make the determined changes. If the entity does not have the required permissions, the newly-established ACL may be rejected in favour of the existing ACL, for improved security.

As mentioned above, at step 106 in FIGS. 1 and 2, a prior setting is added to the established configuration data ACL for the subordinate device(s). In method 100' (FIG. 2), at step 108 a check is performed to determine if at least one time-limited override is required for the subordinate device. If a time-limited override is required, a further check is performed at step 111 to determine if the at least one override setting is permitted by a priority settings hierarchy, as explained earlier. In embodiments, a time-limited override for a particular prior setting may have already been added to the ACL 204 for the subordinate device(s) 218, (and may not yet expired or been revoked). In this case, if at step 108 a new time-limited override for the same prior setting is requested, then the new time-limited override for that prior setting may be accepted (and may replace the existing time-limited override) if the existing and the new time-limited override have the same priority level in the priority settings hierarchy. This may prevent an entity from overriding a prior setting, or an existing time-limited override, if the entity does not have the required privileges/permissions as defined in the priority settings hierarchy.

In embodiments, multiple entities may be defined to have the same privileges/permissions in the ACL 204. For example, groups of people (e.g. workers in the same office, or all the children residing with their parents in a house, etc.), may be defined to have the same privileges/permissions.

Accordingly, if a time-limited override for a prior setting is entered by one office worker, then that time-limited override could be replaced by a second time-limited override for the same prior setting that is requested by a different office worker (assuming the office workers have the same privileges). However, if the second time-limited override for the prior setting was requested by someone with a lower privilege level (e.g. a temporary member of staff in the office), then the request may be rejected such that the original time-limited override may not be automatically replaced. Similarly, if the second time-limited override for the prior setting was requested by someone with a higher privilege level (e.g. a manager of the office workers), the second time-limited override may automatically replace the original time-limited override.

Figure 3:
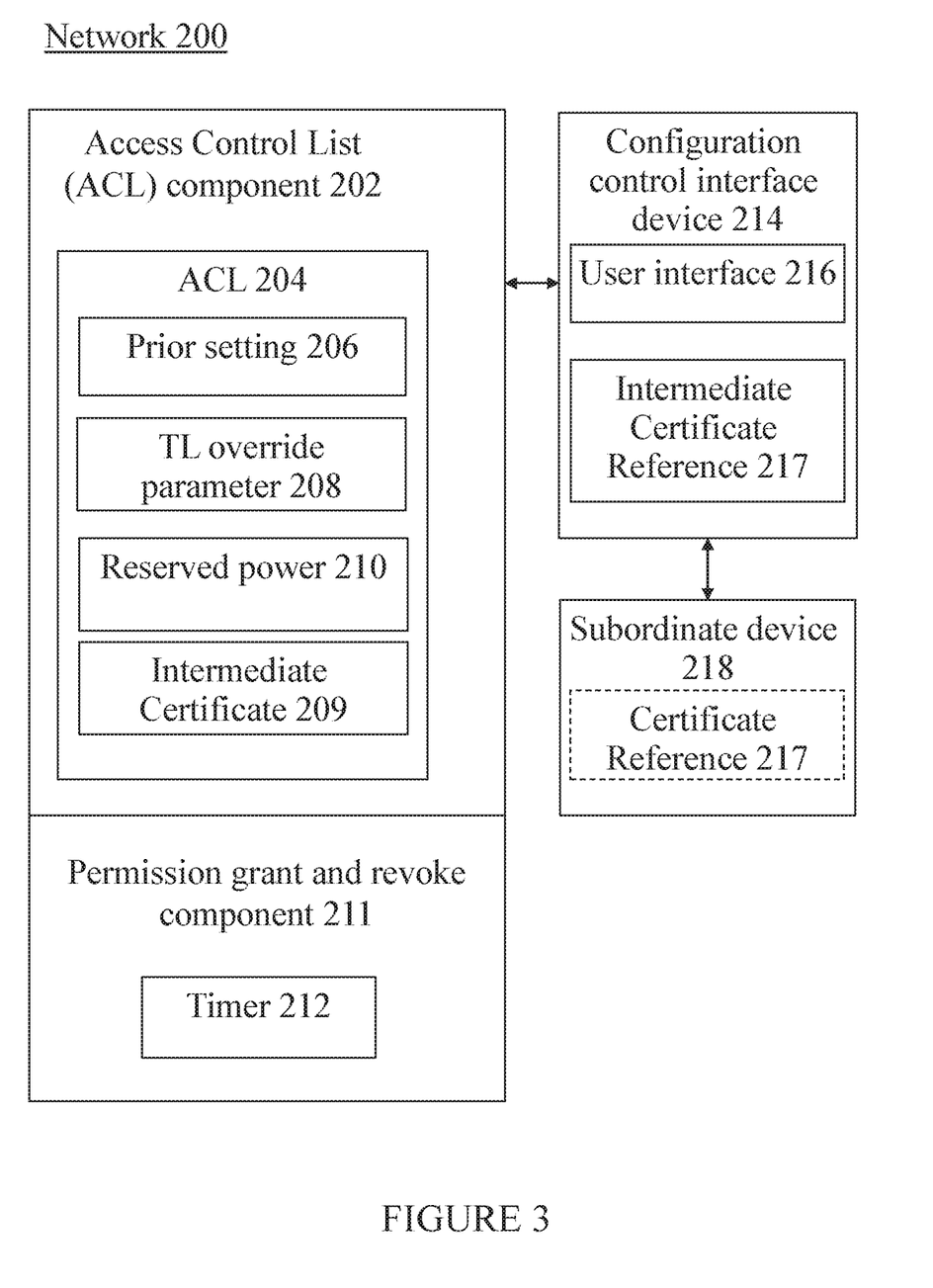
FIG. 3 shows a block diagram of a system to control temporary access to a configuration setting of a subordinate device.

Turning to FIG. 3, this shows a block diagram of a system to control temporary access to a configuration setting of a subordinate device. Network 200 comprises at least one subordinate device 218, though it may comprise a plurality of subordinate devices. (A single subordinate device 218 is shown for the sake of simplicity). Each subordinate device 218 may be controlled or configured using a configuration control interface device 214. The configuration control interface device 214 may store and apply configuration settings to the or each subordinate device 218 which it is coupled to, such as the configuration data access control list (ACL) and the prior setting for each subordinate device. The configuration control interface device 214 may be coupled to one or more subordinate devices 218 within the network. For example, a configuration control interface device 214 may be coupled to a subordinate device in a room, or the configuration control interface device 214 may be coupled to multiple or all of the subordinate devices in a room. Thus, the network may comprise multiple configuration control interface devices 214 each coupled to one or more subordinate devices 218, but only a single configuration control interface device 214 is shown here for the sake of simplicity. The configuration control interface device 214 may comprise a user interface 216. The user interface 216 may be used to input time-limited override parameters for each subordinate device 218. For example, a user may use the user interface 216 to change the time at which motorised curtains or window blinds in his room automatically open in the morning.

The system comprises an access control list (ACL) component 202. The ACL component 202 may be located remote to the or each configuration control interface device 214 in the network 200. The ACL component 202 may be coupled to the or each configuration control interface device 214 via a wired or wireless communication channel. Thus, the ACL component 202 may be used to remotely create and apply configuration settings to the or each subordinate device 218 in the network 200, via the configuration control interface device(s) 214. The ACL component 202 may, for example, be an electronic device or be part of an electronic device (not shown), the electronic device having at least one processor which may be accessed by the ACL component 202.

The ACL component 202 comprises an access control list (ACL) 204 for the or each subordinate device 218. In embodiments, an ACL 204 may be used to configure multiple subordinate devices 218 of the same type (e.g. lighting devices, or heating devices), such that a single ACL 204 may be applied to configure a set of subordinate devices 218.

The ACL 204 comprises a prior setting 206. The prior setting 206 may be added to the established configuration data ACL 204 for the subordinate device(s) 218. The prior setting 206 is a configuration setting, or a plurality of configuration settings, which forms the default settings of each subordinate device 218 at particular times. For example, the prior setting 206 may be a setting that applies every other week on Tuesday to Wednesday, or may be a setting which applies every day between 06:00 and 09:00. In an example scenario where the subordinate device 218 is a lighting device located in each room in a house or hotel, the prior setting 206 may be to turn on the light between 18:00 and 22:00 each day, and may be to turn off the light between 22:01 and 09:00 each day. Once the prior setting 206 has been added to the configuration data ACL 204 for a subordinate device 218, the prior setting 206 is automatically used to control the subordinate device 218, unless the prior setting 206 is overridden.

The ACL 204 may comprise a time-limited parameter 208. A user may input a time-limited override for a particular subordinate device 218 via the user interface 216 of the configuration control interface device 214. The time-limited override may be a time-limited parameter 208 or setting for the subordinate device 218 which is only applicable for a particular predefined period of time (e.g. a specific length of time, or a combination of 'usage time' and 'goodwill time' as described above). For example, a hotel guest may enter a time-limited parameter 208 related to the operation of a lighting device in his hotel room, which is only applicable for the duration the guest stays in the hotel. Thus, the time-limited parameter 208 may comprise two components:

a setting or parameter related to the operation of a subordinate device 218, and a time period which defines how long this setting or parameter can be applied to the subordinate device 218. Alternatively, the time-limited parameter may only comprise the setting or parameter related to the operation of a subordinate device 218, and the time period may be provided separately. In either case, the time period may be specified by the owner of the subordinate device or the administrator of the ACL 204. If the time-limited parameter 208 is accepted, the time-limited parameter 208 is added to the ACL 204 and the updated ACL 204 is transmitted to the configuration control interface device 214 for application to the relevant subordinate device(s) 218.

As described above with reference to FIG. 2, in embodiments if a time-limited override is required, a check may be performed to determine whether the at least one override setting/parameter is permitted by a priority settings hierarchy. The priority settings hierarchy may be used to determine whether the override settings are allowed or if the prior settings should be used instead. A high priority associated with a prior setting 206 may mean that a temporary user of a subordinate device 218 cannot override the prior setting 206. That is, the temporary user's attempt to override the prior setting 206 is itself overridden by the original, high priority prior setting 206. Thus, in embodiments, during the time period associated with the override setting, a reserved power of higher priority 210 in a hierarchy of priorities may permit a further override of the time-limited override parameter 208. The reserved power of higher priority 210 specifies an entity having a "reserved higher level of priority" or a "reserved higher level of control". That is, in embodiments, an entity (e.g. another user of subordinate device 218 or an owner of the subordinate device 218, or another device which controls the subordinate device 218), may be able to override any requested override settings, as the entity has a superior or higher level of control of the subordinate device 218.

The ACL component 202 may further comprise a permission grant and revoke component 211 which may be operable to grant permission to a configuration control interface device to override a prior setting 206 for a time period by adding a time-limited override parameter 208 to the access control list 204. The permission grant and revoke component 211 may check, for example, if a time-limited override input by a user via the user interface 216 (or otherwise) is permitted. The permission may be granted if the time-limited override request is input within a permitted time period, or if the time-limited override request does not violate a hierarchy of priorities. Thus, the permission grant and revoke component 211 may be configured to access the reserved power 210 to determine if a time-limited override request complies with a hierarchy of priorities. The permission grant and revoke component 211 may comprise a timer 212, or may access a timer 212 located elsewhere. The timer 212 may be used by the permission grant and revoke component 211 to determine if and when a time limit has expired. When a time limit has expired, the permission grant and revoke component 211 may cause the time-limited parameter 208 added to the ACL 204 to be revoked, such that the settings of a subordinate device 218 revert to the prior setting 206.

In embodiments, granting permission to a configuration control interface device to override a prior setting comprises associating an indication of identity to the time-limited override parameter. The indication of identity may be any one of: user identification, reference to a user identification, a digital certificate, a reference to a digital certificate, a digital signature, and a reference to a digital signature. For example, the indication of identity may be used to determine whether the request to override a prior setting originates from an entity that has the requisite permissions, and accordingly, the indication of identity may be stored alongside, appended to, or otherwise associated with the time-limited override parameter. The user identification may be a user's name or other ID (e.g. a guest identity "GID"). A digital certificate or digital signature may be used in a similar way to determine the authenticity and/or validity of a request to override a prior setting, and may be associated to the time-limited override parameter as proof that the override was permitted.

In embodiments, a time-limited override parameter 208 may be revoked by revoking an intermediate certificate 209 (which is a type of indication of identity). As mentioned earlier, the intermediate certificate 209 may be associated with a user of the subordinate device 218, or may be associated with an instance (e.g. a particular use of a subordinate device, or a particular time-limited override parameter of a subordinate device). The intermediate certificate 209 may be created for a user by the owner of the subordinate device and may be stored within the ACL 204. Alternatively, the intermediate certificate 209 may be stored within the permission grant and revoke component 211.

The intermediate certificate 209 may include details on, for example, what permissions the user has with respect to the subordinate device 218 and how long the intermediate certificate 209 is valid for (e.g. the usage time plus the goodwill time). The intermediate certificate 209 may be used by the user when he requests a time-limited override of a setting of the subordinate device 218, as described earlier. In embodiments, an intermediate certificate reference 217 may be created when a setting of a subordinate device 218 is altered using the intermediate certificate 209. The intermediate certificate reference 217 may be stored within subordinate device 218, or may be stored within the configuration control interface device 214.

In an example scenario, a user of subordinate device 218 makes a request to change a setting of the subordinate device 218 and uses his intermediate certificate 209 as permission to make the change. During the process to change the setting of the subordinate device 218, the subordinate device 218, or the interface device 214, cryptographically verifies the permissions and the priority of the user and the associated intermediate certificate 209. If the verification process is successful, the setting of the subordinate device 218 is changed and either the device 218 itself, or the interface device 214, stores data indicating which certificate was used to apply the changed setting. In embodiments, the device 218 (or interface device 214) may only need to remember a reference to the intermediate certificate, or a reference to a hash of the intermediate certificate (or an abbreviated version of the hash), such that it may discard the verification or the intermediate certificate 209 itself. Thus, if multiple settings of the subordinate device 218 are altered by the same user using the same intermediate certificate 209 (e.g. the on/off time, the intensity, the colour etc. of a lighting device), the device 218/device 214 may only need to store an intermediate certificate reference 217 for each setting and one copy of the certificate 209 (or the verification of the certificate 209). This may reduce the amount of data stored in device 218/device 214.

In embodiments, the permission grant and revoke component 211 may check whether a time-limited override parameter 208 is still valid when the time period associated with the override parameter 208 is approaching, or when the closest expiration period is approaching. For example, if a time-limited override parameter 208 is valid for the usage time combined with the goodwill time, the closest expiration period may be the usage time on its own, while the maximum expiration period is the combination of usage time and goodwill time. Thus, the permission grant and revoke component 211 may be configured to check if a time-limited override parameter 208 is valid at the expiry of the usage time, and if still valid, may be configured to re-check validity at the expiry of the usage time plus the goodwill time. At either time, if the override parameter 208 is no longer valid, the override parameter 208 may be revoked.

Additionally or alternatively, the permission grant and revoke component 211 may be configured to check the validity of the time-limited override parameter 208 upon receipt of a revocation of e.g. the intermediate certificate 209 associated with the parameter, or the digital signature associated with the parameter. For example, if a guest in a hotel checks out of a hotel ahead of the hotel's checkout time, the hotel may be prompted to revoke the guest's intermediate certificate 209. Upon receipt of a revocation request, the permission grant and revoke component 211 may revoke the intermediate certificate 209 (e.g. delete it from the ACL 204), even though the usage time has not yet expired.

Thus, in embodiments, removing the time-limited override parameter from the access control list comprises revoking the indication of identity associated to the time-limited override parameter.

Additionally or alternatively, the permission grant and revoke component 211 may be configured to check the validity of the time-limited override parameter 208 upon request for a new request to change the prior setting 206 of the subordinate device 218. For example, if a time-limited override parameter 208 already exists for e.g. the maximum volume level of a music-playing device, and the permission grant and revoke component 211 receives another request to override the same parameter (the maximum volume level), then the permission grant and revoke component 211 may be configured to check the validity of the existing time-limited override parameter 208. As a result, the permission grant and revoke component 211 may revoke the existing time-limited override parameter 208 and replace it with a new override parameter based on the new request, or it may retain the existing time-limited override parameter 208 (e.g. if the new request is invalid).

In embodiments, a time-limited override parameter for one particular setting of a subordinate device may be dependent on a prior setting and/or a further time-limited override parameter for a different setting of a subordinate device. For example, a time-limited override parameter for changing the maximum bass level of a music-playing device may be dependent on the prior setting or a time-limited override parameter for the maximum volume level of the music-playing device. In this example scenario, if the maximum volume level is high, the maximum bass level may also be high, but if the maximum volume level is to be kept low (e.g. during particular hours of the evening and during the night), then the bass level may also need to be kept low. Thus, the bass level may be dependent on the volume level, and accordingly, the time-limited override parameter for the bass level may be dependent on the prior setting or time-limited override parameter of the volume level.

Thus, in embodiments, the permission grant and revoke component 211 may be configured to check the validity of a time-limited override parameter 208 upon receiving a request to change a dependent setting. For example, if a request is received to change the bass level of a music-playing device, the permission grant and revoke component 211 may be configured to check the volume settings of the music-playing device because the bass level setting is dependent on the volume setting.

In embodiments, the permission grant and revoke component 211 may be configured to check the validity of a time-limited override parameter 208 of one subordinate device upon receiving a request to change a dependent setting of a second subordinate device. Thus, determining whether an override request to change a setting of a subordinate device may be dependent not only on whether the override is permitted (as explained above with reference to FIGS. 1 and 2), but may also be dependent on a setting or a 'state' of at least one other subordinate device. For example, if a request is received by a guest in a hotel room to increase the maximum volume of a music-playing device in his room, the permission grant and revoke component 211 may be configured to determine if a window in the hotel room is open or closed. A sensor coupled to each window in the hotel room may indicate whether the window is open or closed, and may be able to provide information on the 'state' of the window (i.e. whether it is open or closed), to other devices in the network 200. For example, the configuration control interface device 214 may be able to receive state information from the sensor, and provide this to the permission grant and revoke component 211 (or the state information may be transmitted directly from the sensor to component 211). If the permission grant and revoke component 211 determines that the window is open, the component 211 may prevent override of the maximum volume setting of the music-playing device. (This may be a desirable rule because if loud music is played with a window open, other guests in the hotel would be disturbed). Thus, in embodiments, implementation of a time-limited override parameter may be dependent on the setting or state of an external device (which may be another subordinate device).

Thus, in embodiments, granting permission may further comprise determining whether the prior setting is dependent upon one or both of: a further prior setting of the subordinate device, and a prior setting or state of an electronic device.

Figure 4A:
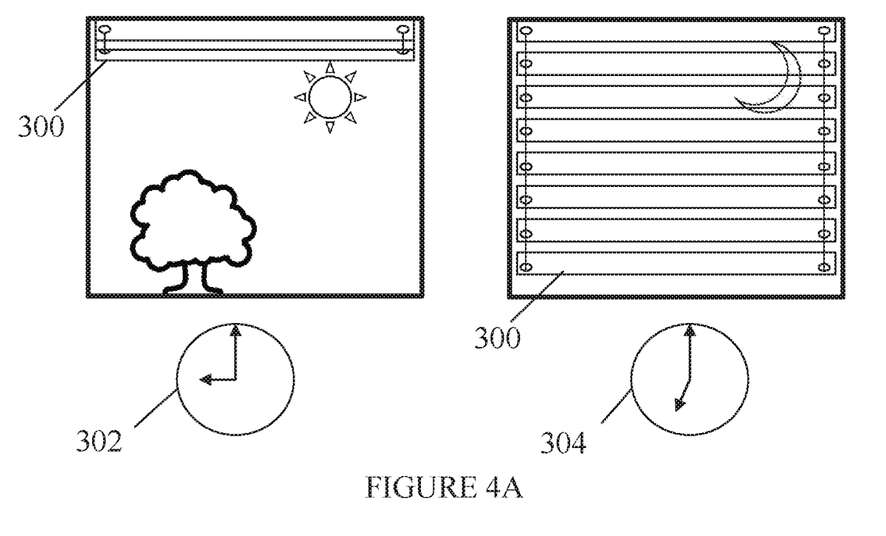
FIGS. 4a and 4b are illustrations of an example scenario in which temporary access to a configuration setting of a device may be controlled.
Figure 4B:
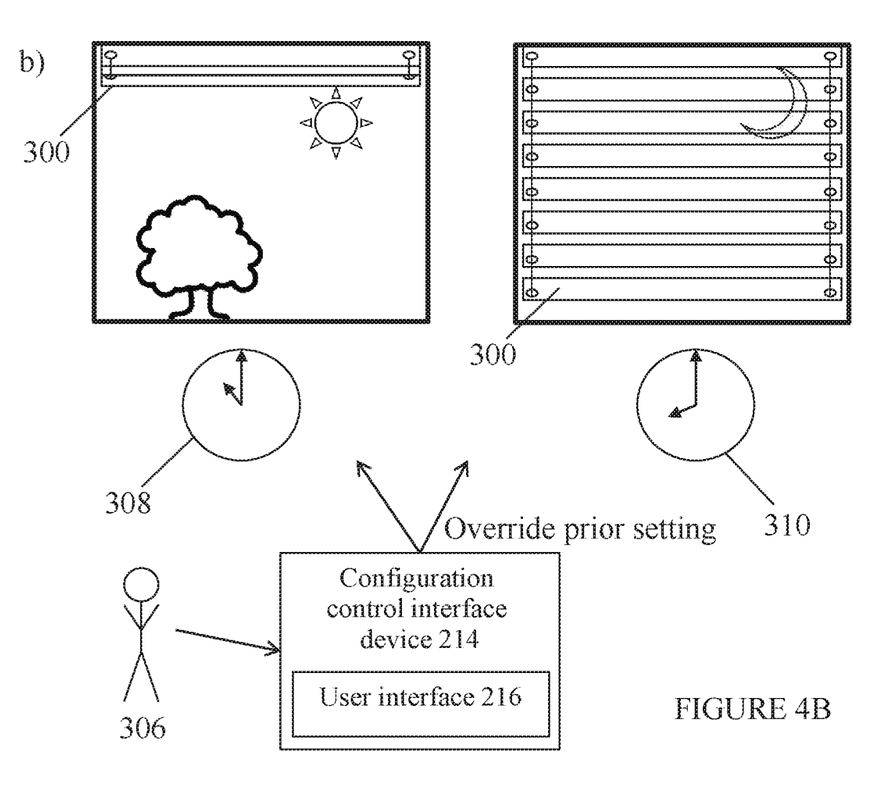

FIGS. 4a and 4b are illustrations of an example scenario in which temporary access to a configuration setting of a device may be controlled. In this example scenario (which is provided merely for illustrative purposes), a window in a house or hotel room is fitted with motorised window blinds 300, which are a type of subordinate device. FIG. 4a shows how the owner or administrator may have defined the access control list for the operation of the motorised window blinds 300. For example, the prior setting of the motorised window blinds 300 may be such that they are automatically raised at a start time 302 (e.g. 09:00 in the morning) and are automatically lowered at an end time 304 (e.g. 19:00 in the evening).

In FIG. 4b, a temporary guest 306 in a house or hotel may attempt to override the prior settings of the motorised window blinds 300. For example, he may wish to sleep for longer and therefore, may not want the window blinds 300 to open until later in the morning. Thus, the temporary user 306 of the window blinds 300 may use a configuration control interface device 214 that is coupled to the window blinds 300 to override the prior settings. The temporary user 306 may input his override request into the system via user interface 216, which may specify that the start time 302 be overridden to a different start time 308 (e.g. 11:00 in the morning) and that the end time 304 be overridden to a different end time 310 (e.g. 20:00 in the evening). As described above, if the override request is acceptable, a time-limited override parameter is added to the ACL associated with the window blinds 300, and the window blinds will be temporarily operated based on the time-limited override parameters specified by user 306. However, in embodiments, a time-limited override parameter may not be permitted, because it violates a hierarchy of priorities. The owner of window blinds 300 may have set the end time 304 to be a high priority parameter (e.g. for security reasons), and therefore, the override request submitted by user 306 to change the end time 304 to a later time may not be accepted. In this case, the user's override request is itself overridden by the higher priority parameter of the prior setting.

There is thus provided, in one implementation, a time-limited configuration settings hierarchy, introducing a temporary override setting that allows a fall-back to a prior setting after the expiry of a time period. This seamlessly fits in with the conventional use of certificate based general-purpose ACLs to control overall access to IoT installations, but it allows temporary users to have much higher levels of privilege over configuration settings, as an automatic revocation of the permission and reversion to the previous settings is guaranteed on the expiry of the specified time period. This technology also enables the use of intuitive user interfaces on devices such as smartphones, wearables, or other portable equipment, by temporary users of facilities, such as hotel guests, visitors in residential homes or users of rental products (cars, bicycles, mobility scooters, etc.), without leaving them still in control after the end of the visit or rental period.

For such temporary users, it is desirable to have configuration settings that can be applied at a certain time (using a "valid from" parameter, for example). In implementations of the present technology, the settings may also have an expiry time (using a "valid-to" parameter, for example.)

As one concrete example, in certain situations, such as visits from a domestic helper, it would be useful to have access control permissions granted to the helper by which the helper could access and modify certain configuration settings from a smartphone using a local wireless connection, but that such permissions would only be valid on Tuesday and Wednesday, during daylight hours. In this way, the helper's control over, for example, security shutters would be limited to those days on which the helper needed to open the shutters in order to work, but the permission would be revoked and the shutters automatically closed according to a prior, "normal", setting to maintain security when the helper was not expected to be working in the home. Similarly, a time period could be set limiting the period during which the helper could disable the security alarm system in the home—for example, on arrival, the disabling of the alarm could trigger the start of a clock, such that the helper would be required to re-enable the alarm system and leave by a fixed time, after which the alarm system configuration settings could only be accessed and modified by the home owner until the next arranged visit from the helper.

In a further example, in a rented room, in for example, a hotel, the room lighting's RGB colour could be set to have a blue tint in the morning (06:01-15:00) to wake up the occupant, but a reddish tint from (15:01-06:00) to prepare the occupant for sleep. By having the essential underlying control logic moved into a configuration ACL, no special knowledge about RGB LEDs and the manner in which times of day are set up is necessary for the temporary occupant, who could use a simple interface (for example, an app on a smartphone), to temporarily override the prior settings in preparation for an early night. The settings would then revert to the prior configuration at the end of the room occupancy in readiness for the next guest. In this example, a guest could change the light settings, with a maximum expiration time (8 hours, etc.) but that setting would be garbage-collected after that time and replaced by the prior setting by the owner. For example, in a traditional X509 based ACL set up to provide "inheritance" of some control from the landlord or hotel proprietor to the guest, the guest may be granted 48 hours' access—all configuration settings would as a result inherit the 48 hours' deadline, and the settings of all devices would revert to the prior setting upon the guest leaving.

The hierarchical prioritization mechanism described above has the further advantage that, even though a guest may be given some temporary control, that control may be itself overridden by a higher power of priority reserved by the owner of the facility. In the case of a hotel, for example, guests can be permitted to configure window-blind motor settings during the hours between 09:00 and 18:00, but the owner may retain a "powers reserved" higher priority override from midnight to 06:00 to enforce closing of the blinds for security reasons.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method of controlling prioritized temporary access to a configuration setting of a subordinate device in a network of electronic devices by a configuration control interface device, the method comprising:
   receiving, at the configuration control interface device from an access control list (ACL) component, a configuration data ACL specifying access rights to the configuration setting for one or more entities wherein the configuration setting is to control the operation of the subordinate device, the configuration data ACL further specifying a default setting for the configuration setting;
   applying, with the configuration control interface device, the configuration data ACL to the subordinate device to control the operation of the subordinate device in accordance with the default setting specified in the configuration data ACL;
   sending, from the configuration control interface device to the ACL component, a request to define the configuration setting for a specified time period;
   receiving, at the configuration control interface device from the ACL component, a first updated configuration data ACL comprising a time-limited parameter to define the configuration setting for the specified time period; and
   applying, with the configuration control interface device, the first updated configuration data ACL to the subordinate device to control the operation of the subordinate device in accordance with the configuration setting defined by the time-limited parameter;
   sending, from the configuration control interface device to the ACL component, a request to revoke the configuration setting before expiry of the specified time period;
   receiving, at the configuration control interface device from the ACL component, a second updated configuration data ACL to revoke said time-limited override parameter before expiry of said specified time period, the second updated configuration data ACL specifying the default setting for the configuration setting;
   applying, with the configuration control interface device, the second updated configuration data ACL to the subordinate device to control the operation of the subordinate device in accordance with the default setting.

2. The method of claim 1, wherein during said time period a further parameter in said configuration data access control list determines volatility of at least one of said time-limited override parameter and said further override parameter following an interruption and resumption of an in-use state of a device in said network of devices.

3. The method of claim 2, wherein said interruption and resumption comprises at least one of a sleep-wake cycle, a power cycle and a failure and resume cycle.

4. The method of claim 1 wherein said establishing a configuration data access control list comprises establishing a cryptographically verifiable access control list to permit tamper-prevention.

5. The method of claim 1 wherein said granting permission comprises granting access to a subset of subordinate devices in said network.

6. The method of claim 1 wherein said granting permission comprises granting access to a subset of a hierarchy of priorities.

7. The method of claim 1 wherein said granting permission further comprises granting permission to delegate said permitting to a further configuration control interface device to override said default setting.

8. The method of claim 1 wherein said granting permission further comprises determining whether the default setting is dependent upon one or both of: a further prior default of the subordinate device, and a default setting or state of an electronic device.

9. An electronic system operable to control prioritized temporary access to a configuration setting of a subordinate device in a network of electronic devices, comprising:
   a first electronic component operable to:
      receive, from an access control list (ACL) component, a configuration data ACL specifying access rights to the configuration setting for one or more entities, wherein the configuration setting is to control the operation of the subordinate device, the configuration data ACL further specifying a default setting for the configuration setting;
      apply the configuration data ACL to the subordinate device to control the operation of the subordinate device in accordance with the default setting specified in the configuration data ACL;
      send, to the ACL component, a request to define the configuration setting for a specified time period;
      receive, from the ACL component, a first updated configuration data ACL comprising a time-limited parameter to define the configuration setting for the specified time period;
      apply the first updated configuration data ACL to the subordinate device to control the operation of the subordinate device in accordance with the configuration setting defined by the time-limited parameter;
      send, to the ACL component, a request to revoke the configuration setting before expiry of the specified time period;
      receive, from the ACL component, a second updated configuration data ACL to revoke said time-limited override parameter before expiry of said specified time period, the second updated configuration data ACL specifying the default setting for the configuration setting;

apply the second updated configuration data ACL to the subordinate device to control the operation of the subordinate device in accordance with the default setting.

10. A computer program product comprising a non-transitory readable storage medium comprising computer program code executed by a computer system to cause said computer system to perform the following steps:
  receiving, at the configuration control interface device from an access control list (ACL) component, a configuration data ACL specifying access rights to the configuration setting for one or more entities wherein the configuration setting is to control the operation of the subordinate device, the configuration data ACL further specifying a default setting for the configuration setting;
  applying, with the configuration control interface device, the configuration data ACL to the subordinate device to control the operation of the subordinate device in accordance with the default setting specified in the configuration data ACL;
  sending, from the configuration control interface device to the ACL component, a request to define the configuration setting for a specified time period;
  receiving, at the configuration control interface device from the ACL component, a first updated configuration data ACL comprising a time-limited parameter to define the configuration setting for the specified time period; and
  applying, with the configuration control interface device, the first updated configuration data ACL to the subordinate device to control the operation of the subordinate device in accordance with the configuration setting defined by the time-limited parameter;
  sending, from the configuration control interface device to the ACL component, a request to revoke the configuration setting before expiry of the specified time period;
  receiving, at the configuration control interface device from the ACL component, a second updated configuration data ACL to revoke said time-limited override parameter before expiry of said specified time period, the second updated configuration data ACL specifying the default setting for the configuration setting;
  applying, with the configuration control interface device, the second updated configuration data ACL to the subordinate device to control the operation of the subordinate device in accordance with the default setting.

* * * * *